United States Patent Office 3,014,009
Patented Dec. 19, 1961

3,014,009
CARBOHYDRAZIDE CURING AGENT FOR EPOXIDE TYPE RESINS
Harold H. Levine, San Diego, Calif., assignor to Narmco Industries, Inc., San Diego, Calif., a corporation of California
No Drawing. Filed July 20, 1959, Ser. No. 828,060
4 Claims. (Cl. 260—47)

This invention relates generally to thermosetting epoxide resinous compositions, and relates especially to thermosetting epoxide resin compositions which remain uncured at near room temperature and which can be rapidly cured by means of a relatively mild cure cycle.

For the ultimate processor, the advantages of a preblended epoxide resin composition over a two component or two part system of resin and curing agent therefor, are many. (By a preblended resin composition, I mean a resin composition having a curing agent incorporated therein at some time prior to final curing of the composition.) The one component system eliminates mixing operations, and measuring operations, eliminates mixing equipment, and avoids possibilities of waste due to errors in measuring or errors due to lack of thoroughness in mixing, at the ultimate processing level, and is thus of great commercial importance.

Of those preblended epoxide resin compositions in the prior art, there are some which are stable at room temperature, but these usually require a relatively severe curing cycle. In frequent laminating, bonding, coating, etc. applications, however, the use of a severe curing cycle detrimentally affects the material to which the resin composition is applied. Thus the preblended epoxide systems are, in many instances, not of practical use, even though stable, because of their required relatively severe curing cycle.

Bearing in mind the foregoing facts, it is a major object of the present invention to provide a stable, preblended epoxide resin composition that can be completely cured by means of a curing cycle which is substantially less severe than is usually found necessary for stable preblended epoxide resin compositions of the prior art.

It is another major object of the present invention to provide a stable preblended epoxide resin composition which can be cured by means of a relatively mild curing cycle, the resulting cured product having physical properties at least comparable to stable preblended epoxy systems of the prior art, which require a more severe curing cycle.

Another object of the present invention is to provide a stable preblended epoxide resin system, which can be processed in a novel manner, by means of a relatively mild curing cycle, the cured system having very greatly improved physical properties and very highly increased resistance to certain chemicals.

These and other objects and advantages will become clearly understood by referring to the following description.

In general, my invention is directed to the preparation of stable preblended systems which are nevertheless capable of being completely cured at relatively low temperatures and/or within relatively short times. Hitherto, these two very desirable characteristics seemed incompatible in a single epoxide resin system. More specifically, I have discovered that carbohydrazide (NH$_2$NHCONHNH$_2$)

when mixed with epoxide resins, provides resinous compositions or systems which are normally stable at temperatures of about 40° F., and are capable of being cured at relatively low temperatures, and for relatively short periods of time, compared to the usual stable preblended epoxide resinous compositions of the prior art.

The epoxide compositions of my invention react to produce cured products which are, in general, at least equal, in physical properties to other cured epoxy compositions. My compositions are suitable for use as adhesives, coatings, potting compounds, castings and laminates or reinforced products.

Further, the carbohydrazide-epoxide resinous systems when cured in a novel manner, as disclosed in detail in a co-pending application entitled "Novel Epoxide Type Resin Compositions and Process for Making Same" of Finn Claudi-Magnussen and myself (which is incorporated herein by reference), exhibit outstandingly improved physical properties with respect both to conventionally cured carbohydrazide-epoxide resinous systems, and other conventionally cured, normally stable preblended epoxide systems.

As a specific example of the advantages of our novel epoxide system over stable preblended systems of the prior art, 100 parts Epon 828 (a bisphenol-A type of epoxide resin manufactured by the Shell Chemical Corporation) and 12 parts of carbohydrazide were mixed in a suitable container, the mixture being stable at 40° F. The mixture was then applied to a metal part and heated to a temperature of 300° F. for 40 minutes. A complete cure of the mixture thereby resulted.

In contrast, a stable preblended epoxide system of the prior art, comprising 100 parts of Epon 828 and 25 parts isophthalic dihydrazide, was applied to a metal strip, and completely cured. The cure cycle required, however, for complete curing, was 350° F. for 60 minutes. The resulting physical properties of the two systems were generally excellent and comparable in value. However, the increase in severity of the curing cycle in the Epon 828-isophthalic dihydrazide system frequently causes the part to which the resin system is applied to be adversely affected. For example, in the process of bonding some metals, it is believed that certain adverse changes in grain structure of the metal may take place when subjected to temperatures much above 300° F. for a period of an hour or more. Therefore, my 40° F. stable resin composition, which is a highly reactive system at 300° F., is extremely useful in such applications.

The seeming inconsistency in having a preblended epoxide resin system, stable at about 40° F., yet highly reactive at about 300° F. or lower, is theoretically explainable in terms of the structure of the carbohydrazide. It is believed that carbohydrazide has the reactivity of a hydrazinyl radical, due to the presence of the NH$_2$NH- portion of the carbohydrazide molecule, and does not act as a hydrazidyl radical. This behavior, of course, could not be predicted. The hydrazinyl portion appears to have an appreciably higher reactivity with functional epoxide groups

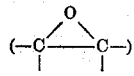

than does the hydrazide radical. Thus, when dihydrazide-epoxide resin systems are cured, substantially higher curing temperatures and/or longer curing times are necessary—indicating that the reactivity of the dihydrazides is substantially less than that of the carbohydrazide.

While a theory has been outlined which appears reasonable, and accounts for the results noted, it will, of course, be understood that I do not wish to be bound thereby. There may be other possible theories of equal validity.

As mentioned, a prediction of the properties to be expected in the carbohydrazide-epoxide resin system, in light of the dihydrazide-epoxide resin system, could not be made since the role played by the constituent radicals in carbohydrazide is not definitely ascertainable, and does not necessarily bear any chemical relationship to dihydrazide compounds. Thus, for example, the dihydrazides are all organic compounds—e.g. oxalyl dihydrazide or adipyldihydrazide, whereas carbohydrazide is normally classed as an inorganic compound. And, as will be seen in detail hereafter, the diyhdrazides react significantly differently to the partial advancement process described in the above-identified co-pending application of Finn Claudi-Magnussen and myself than does carbohydrazide, indicating again essential differences between the dihydrazides and carbohydrazide.

The carbohydrazide-epoxide resin preblended system of my invention is found to be additionally extremely useful because, in addition to its stability and mild curing cycle, it is found that processing the carbohydrazide-epoxide resin system, according to the teachings in the above-identified co-pending application, results in a cured system having outstanding properties, including high bend strength at room temperature together with very high strength at elevated temperature.

The process of the co-pending application (with reference to carbohydrazide) may be set forth briefly as follows: the carbohydrazide and epoxy resin are made homogeneous, as by stirring, and heated so as to partially advance the system to a predetermined terminal viscosity. The system is then cooled at a controllable rate, and, at some later time (e.g. a minute, a week or months) the system is employed in a particular assembly or application, e.g. as a coating, and finally cured "in situ," i.e. on the particular material of the assembly or application. The resulting cured product has outstanding physical properties over the non-advanced or conventionally cured material.

Comparative results are set forth below in Table I. The gel time is that time remaining before the resin system gels. The resin mixture not advanced was heated at 300° F. for 40 minutes, in contact with a metal strip, to be thereby cured.

TABLE I

| Resin | P.h.r.[1] carbohydrazide curing agent | Advanced | Advancement temp. °F. | Gel time (sec.) at 350° F. | R.T.[2] shear | 300° F. shear | R.T. bend |
|---|---|---|---|---|---|---|---|
| Shell Epon 828 | 17.4 | No | | | 1,925 | 605 | 94 |
| Do | 17.4 | Yes | 212 | 35 | 2,780 | 3,100 | 214 |

[1] P.h.r. equals parts per hundred of resin.
[2] R.T. equals room temperature.

In contrast with the above increase in physical properties, when dihydrazides are cured with the epoxide resins, by means of our novel partial advancement process, no increase in physical properties of the finally cured material takes place. This is indicative of the apparent different reactions that carbohydrazide and the dihydrazides may undergo, and the inability to predict, in advance, the properties of a particular curing agent-epoxy resin system. The actual comparative data for 3 dihydrazides are set forth in Table II.

are produced by the reaction of polyhydric phenols with either polyfunctional halohydrins or polyepoxides or mixtures thereof to form complex reaction products containing terminal epoxide groups

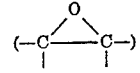

The reaction product has a 1,2 epoxy equivalency greater than 1.0. By the "epoxy equivalency" reference is made to the average number of 1,2 epoxy groups contained in the average molecule of the reaction product. In general, the epoxide resins also contain hydroxyl groups in the molecule.

The polyepoxides may be saturated or unsaturated, aliphatic, cycloaliphatic, aromatic or heterocyclic, and may be substituted if desired with other substituents, such as ether radicals, and the like. They may also be monomeric as well as polymeric.

The monomeric-type polyepoxide compounds may be exemplified by the following: vinyl cyclohexene dioxide, butadiene dioxide, 1,4 - bis (2,3 - epoxypropoxy) benzene, 1,3 - bis (2,3 - epoxypropoxy) benzene, 4,4' - bis (2,3 - epoxypropoxy) diphenyl ether, 1,8 - bis (2,3 - epoxypropoxy) - octane, 1,4 - bis (2,3 - epoxypropoxy) cyclohexane and diglycidyl ether.

Other polymeric polyepoxide compounds include the polymers and copolymers of the epoxy-containing monomers possessing at least one polymerizable ethylenic linkage.

Another group of polyepoxides includes the epoxy esters of polybasic acids, such as diglycidyl pthalate and diglycidyl adipate, diglycidyl tetrahydrophthalate, diglycidyl maleate, and the like.

Particularly preferred polyepoxides are the monomeric and polymeric-type glycidyl polyethers of dihydric phenols obtained by reacting epichlorohydrin with a dihydric phenol in an alkaline medium. The monomer products of this type may be represented by the general formula:

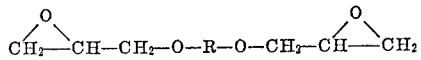

wherein R represents a divalent hydrocarbon radical of the dihydric phenol.

The amounts of carbohydrazide can range between 6 and 40 per hundred parts epoxide resin, although optimum results are usually obtained when employing from between 8 to 20 parts per hundred parts epoxide resin.

To further illustrate the manner in which the invention may be carried out, the following example is given. It is to be understood, however, that the example is for the purpose of illustration, as were the previous examples, and the invention is not to be regarded as limited to any of the specific compounds or conditions recited therein.

One hundred parts of epoxy-novolac resin were mixed with 24 parts of carbohydrazide, by weight, in a reaction vessel, the epoxy-novolac resin used being one of the X2638 series of resins manufactured by Dow Chemical

TABLE II

| Resin | Curing agent | P.h.r. | Advanced | Advancement temp. °F. | Gel time (min.) 350° F. | P.s.i. at R.T. | P.s.i. at 300° F. | R.T. bend, lbs. |
|---|---|---|---|---|---|---|---|---|
| Epon 828 | Isophthalic dihydrazide | 25 | No | | | 2,990 | 2,460 | 132 |
| Do | do | | Yes | 300 | 2 | 2,520 | 2,800 | 121 |
| Do | Sebacic dihydrazide | 30.9 | No | | | 3,825 | 865 | 112 |
| Do | do | | Yes | 265 | 1 | 2,995 | 890 | 158 |
| Do | Oxaldihydrazide | 15.9 | No | | | 1,865 | 710 | 90 |
| Do | do | | Yes | | 6 | 2,190 | 610 | 98 |

The epoxide resins or polymers which are operative in my invention are known commercial materials and Company. (The specific epoxy-novolac resin used was X2638.3.) The epox-novolac resins are based on polyfunctional phenols of the phenol type rather than being based on the bisphenol-A type of epoxide resin.

The resin mixture was stable below temperatures of 40° F. The mixture was then poured onto a metal strip, heated "in situ" for 15 minutes at 275° F., and for 40 minutes at 310° F. The resin composition was, at this point, completely cured, and possessed extremely good salt spray resistance.

I claim:

1. A new composition of matter comprising an epoxide resin having a 1,2 epoxy equivalency greater than 1.0, produced by the reaction of a polyhydric phenol with a 1,2-epoxy-3-halohydrin, and 6 to 40 parts per hundred, by weight, of said resin, of carbohydrazide.

2. The composition of claim 1 wherein 8 to 20 parts of carbohydrazide per hundred parts of resin are used.

3. The reaction product obtained by reacting 100 parts of an epoxide resin having a 1,2 epoxy equivalency greater than 1.0, produced by the reaction of a polyhydric phenol with a 1,2-epoxy-3-halohydrin, with 6 to 40 parts per hundred, by weight, of said resin, of carbohydrazide.

4. The reaction product of claim 3 wherein said reaction takes place at about 300° F.

References Cited in the file of this patent
UNITED STATES PATENTS

| | | |
|---|---|---|
| 2,847,395 | Wear | Aug. 12, 1958 |

FOREIGN PATENTS

| | | |
|---|---|---|
| 54,534 | Netherlands | Apr. 16, 1943 |
| 124,849 | Sweden | May 10, 1949 |
| 893,897 | France | Mar. 6, 1944 |

OTHER REFERENCES

Grant: "Hackh's Chemical Dictionary," page 167, third edition, 1944.